US008312733B2

(12) United States Patent
Tsarev et al.

(10) Patent No.: US 8,312,733 B2
(45) Date of Patent: Nov. 20, 2012

(54) AUTONOMOUS POWER SUPPLY SYSTEM

(75) Inventors: Viktor V. Tsarev, St. Petersburg (RU); Alexander N. Alekseevich, St. Petersburg (RU)

(73) Assignee: IP React LLC, Altamonte Springs, FL (US)

( * ) Notice: Subject to any disclaimer, the term of this patent is extended or adjusted under 35 U.S.C. 154(b) by 305 days.

(21) Appl. No.: 12/724,184

(22) Filed: Mar. 15, 2010

(65) Prior Publication Data

US 2010/0170293 A1    Jul. 8, 2010

Related U.S. Application Data

(63) Continuation of application No. PCT/RU2007/000514, filed on Sep. 14, 2007.

(51) Int. Cl.
*F25B 27/00* (2006.01)
(52) U.S. Cl. ...................................... 62/238.3
(58) Field of Classification Search ............. 62/235.1, 62/238.3, 476; 60/641.8
See application file for complete search history.

(56) References Cited

U.S. PATENT DOCUMENTS

| 4,206,608 A * | 6/1980 | Bell ............................... 60/698 |
| 7,555,897 B2 | 7/2009 | Alekseevich et al. |
| 8,096,293 B2 * | 1/2012 | Hoellenriegel et al. ....... 126/617 |
| 2006/0033338 A1 | 2/2006 | Wilson |

FOREIGN PATENT DOCUMENTS

| DE | 3640121 A1 | 6/1988 |
| RU | 1800073 A1 | 3/1993 |
| RU | 2174191 C1 | 9/2001 |
| RU | 41497 U1 | 10/2004 |
| RU | 2249125 C1 | 3/2005 |

OTHER PUBLICATIONS

International Search Report, mailed Jun. 5, 2008, from International Application No. PCT/RU2007/000514, filed Sep. 14, 2007.
International Preliminary Report on Patentability, dated May 11, 2010, from International Application No. PCTRU2007/000514, filed Sep. 14, 2007.

* cited by examiner

*Primary Examiner* — Melvin Jones
(74) *Attorney, Agent, or Firm* — Patentbar International, P.C.

(57) ABSTRACT

The invention concerns the power systems utilizing renewable power sources, in particular, refers to the systems utilizing wind and solar energy and may be used for the independent power supply both in cold and hot climate. The independent energy supply system (IES) contains a wind generator setup for electric power production and a solar collector. The solar collector is connected with a heat storage. IES also includes an electric energy storage battery, inverter, and automatic control system for IES connected through the heat and electrical load sensors with actuating mechanisms. IES is also equipped with the stabilization system for rotor speed of the wind generator that includes a network regulator with a control unit for a resistive load, electric current sensors and rotor speed sensor. The resistive load is the system of thermal electric heaters (TEHs). The energy dissipated on TENs is to be accumulated in the heat storage. The absorption cooling machine may be included in the IES, and the TEHs may be placed inside its generator. IES contains the device for wind generator blades turning. The heat exchanger of the solar collector is located inside the absorption cooling machine generator.

4 Claims, 2 Drawing Sheets

AUTONOMOUS POWER SUPPLY SYSTEM

RELATED APPLICATIONS

This application is a Continuation of International Application No. PCT/RU2007/000514 filed on Sep. 14, 2007, which is incorporated herein by reference in its entirety.

FIELD OF THE INVENTION

The invention concerns the heat and electric power supply for homes and industrial areas by means of the power systems using renewable power sources.

BACKGROUND OF THE INVENTION

In the conditions of permanent deficit and cost increase of the conventional hydrocarbon power sources, a special attention is paid to usage of so called alternative or renewable energy.

The power systems are known that are produced by plants working on ecologically clean renewable power sources (wind, sun, and etc.). Nevertheless, instability of energy flow in the source (change of wind strength, climatic and seasonal variations of light energy flow) creates obstacles in supplying the consumers with quality energy. To improve the power supply stability, the combined systems are developed where at the same time the energy of more than one sources is used, for example, wind and solar energy.

The Independent energy supply system for homes and industry is known (RU, A, 2249125), where the energy of wind, sun and Earth heat are utilized.

The Independent energy supply system for homes and industry contains a wind generator setup for electric power production connected to electric power consumers; electric energy storage battery connected with the wind generator setup and electric power consumers. To convert direct current of electric storage batteries into alternative current with parameters required for consumers the inverter is used that through the electric storage batteries are connected.

The system includes a plant for solar energy conversion into heat and a heat storage connected to the heat energy consumers. A heat pump driven by the wind generator setup is also used for providing the consumers with heat energy. To control the Independent energy supply system the automatic control system is used that connected through the heat and electric load sensors with actuating mechanisms. The plant for solar energy conversion into heat energy contains a unit of solar collectors coupled through the heat carrier, at least, with two heat exchangers, one of which is located in the heat storage, and other—in the heat-exchange apparatus connected through the heat carrier with the Earth heat storage system. The heat pump contains: compressor operating from the wind generator setup, at least, two external evaporators, one of which is built-up into the heat-exchange apparatus connected through the heat carrier with the Earth heat storage system, and other external evaporator is built-up in the sewage heat recovery unit, and at least two external condensers, one of which is built-up in the heat-exchange apparatus connected through the heat carrier with the heat power consumers.

The system described utilizes a renewable energy of wind, sun and Earth heat what makes possible to provide a sustained delivery of heat and electric power to the consumers even in the absence of/or at low energy flows from one of the power sources. The system is supposed to use not only the heat produced in the solar collectors, but also, so called, "waste" heat sources, for example, by means of sewage heat recovery.

The main disadvantage of the stated system is an insufficient efficiency due to energy losses during conversion procedure. The generators used in the wind generator setups are featuring of their output parameters direct dependency on a rotor speed (voltage, frequency), it means on wind speed as well. The storage battery carries a function of energy storage and voltage stabilizer.

In this system, electric current produced by the wind-powered generator is to be converted: at first the current is transformed to obtain the parameters needed for the storage battery charging. Then, a direct current from the storage battery is converted (inverted) to be supplied to consumers (as a rule an alternative current of 220 V 50 Hz is required). Energy losses, worsening the system parameters, take place at each step of transformation. When a heat and electric storage battery has been charged in full, heat and excessive energy are simply dissipated as generator's heat radiation.

Besides, the system described works effectively only within the specified designed range of winds. So, at strong winds the frequency of the generator current increases excessively, what results in losses increase at current conversion, and at gale-strength wind the wind generator setup may be damaged.

SUMMARY OF THE INVENTION

The base task of the present invention is to create the system of independent energy supply providing increase of its operational effectiveness by means of losses for electric current conversion decrease and within the expanded wind range of the wind generator setup.

The set task is to be solved by means that the Independent energy supply system (IES) containing the wind generator setup for electric power production connected to electric power consumers, the plant for solar energy conversion into heat energy, heat storage coupled through the heat carrier with the indicated plant for solar energy transformation into heat energy, electric energy storage battery and the inverter connected to the wind-generator setup and electric power consumers and automatic control system connected through heat and electric loads sensors with actuating mechanisms, in conformity with the invention, is supplemented with the stabilization system for the rotor speed of the wind generator, including network regulator, electrically bound with the wind generator and containing a control unit for the resistive load electrically bound with the last one and contains a wind generator and resistive load current sensors, generator's rotor speed sensor, synchronizer, controllable switchboard and the resistive load that is a system of thermal electric heaters (TEHs), whereas the energy dissipated on the TEHs is to be accumulated in the heat storage.

Owing to the stabilization system for rotor speed of the wind generator, the electric energy produced by the wind generator setup has parameters allowing its direct delivery to the consumers. By that, the necessity of electric energy conversion to gain required power grid parameters is excluded, what results in loss decrease.

Due to the network regulator and resistive load control unit availability, the maximal utilization of the produced by the wind generator setup energy is achieved owing to the energy re-distribution among the direct consumers and resistive load in real-time mode.

Since the indicated resistive load represents a system of TEHs, heat energy will be produced during stabilizing system operation, that is accumulated in the heat storage and it may be used for a hot-water supply or in a heating system.

Additionally, to work at high wind speeds, it is expediently to include in the stabilization system for rotor speed of the wind generator a second step of adjustment, containing a pivoting device for wind generator blades to change an angle of attack that is to be electrically connected with ACS and a wind speed sensor.

At strong winds such device will permit to lower a wind load on the rotor blades and the tower, and will provide monitoring of maximal power delivered by the generator. That will provide not only for the optimal mode of the generator operation resulting in its life time prolongation, but also will decrease the risk of damage.

When the Independent energy supply system is operating in the conditions of hot climate, when the main power inputs fall on the cooling system, it is expediently to use the absorption cooling machine (ACM), and the heat produced by a resistive load of the stabilization system for rotor speed of the wind generator is to supply directly to the generator's ACM. It contributes to operation efficiency of all the systems of energy supply in the whole.

It is expediently, the plant's heat exchanger for solar energy conversion into heat to place also into ACM generator.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
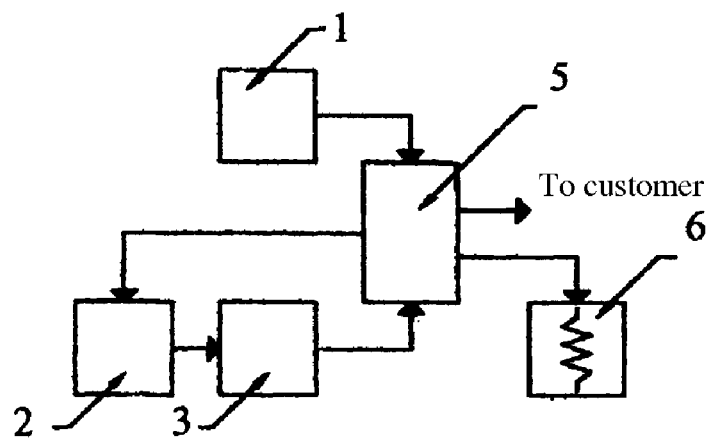
FIG. 1 illustrates the block-diagram of the IES energy supply system performed in conformity with the invention.

As it shown in FIG. 1, the energy supply system IES contains wind generator setup 1 and electric storage battery 2 with inverter 3. IES has an automatic control system (ACS) 4, connected through heat and electric loads sensors with actuating mechanisms. Wind generator 1 and electric storage battery 2 with inverter 3 are electrically bound with network regulator 5. Resistive load 6 is electrically bound through network regulator 5 with wind generator 1. The resistive load 6 is a system of thermal electric heaters (TEHs), here the power dissipated on them is dependent on wind generator operation and on power consumers.

Network regulator 5 (FIG. 2) contains synchronizer 7, control unit for resistive load 8, switchboard 9 and, correspondingly, sensor for resistive load current, and wind generator sensor 10, 11 and charger 12.

A wind generator 1 is equipped with a pivoting device 13 for wind generator blades to change the angle of attack operated by ACS 4. The blades pivoting device 13 can be executed, for example, as bevel gear.

Switchboard 9 and synchronizer 7 serve for coordination of inverter 3 and power generator 1 joint work.

Figure 3:
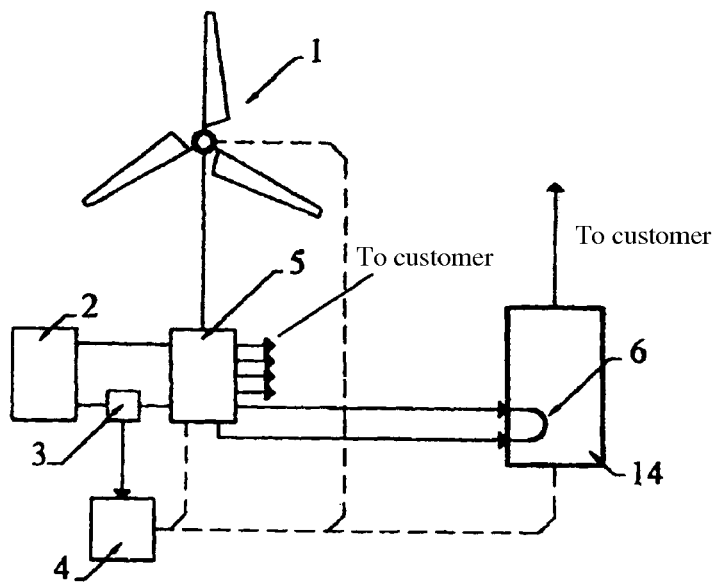
FIG. 3 sketches IES for operation in the conditions of cold climate performed in conformity with the invention.

When Independent energy supply system is working in the conditions of cold climate, the resistive load 6 is to be located in heat storage 14 (FIG. 3).

Figure 4:
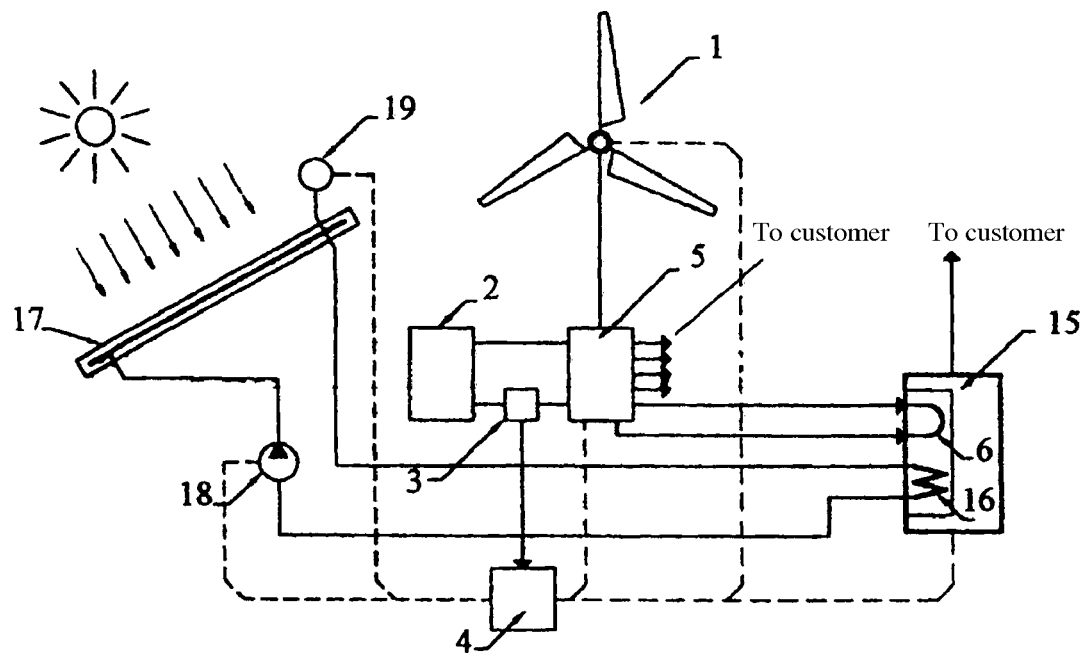
FIG. 4 sketches IES for operation in the conditions of hot climate performed in conformity with the invention.

When Independent energy supply system is working in the conditions of hot climate the heat produced by the adjustable resistive load of the stabilization system for rotor speed of the wind generator is to be supplied to absorption cooling machine generator. Here, resistive load 6 is located directly in the generator 15 of absorption cooling machine (FIG. 4), i.e. generator 15 of absorption cooling machine performs a role of heat storage 14. Heat exchanger 16 of the plant for solar energy conversion into heat is also located in generator 15 of absorption cooling machine. The plant for solar energy conversion into heat includes a solar collector 17 connected through a heat carrier with heat exchanger 16, circulating pump 18 and heat carrier temperature sensor 19. Pump 18 and sensor 19 are electrically bound with ACS 4.

Figure 2:
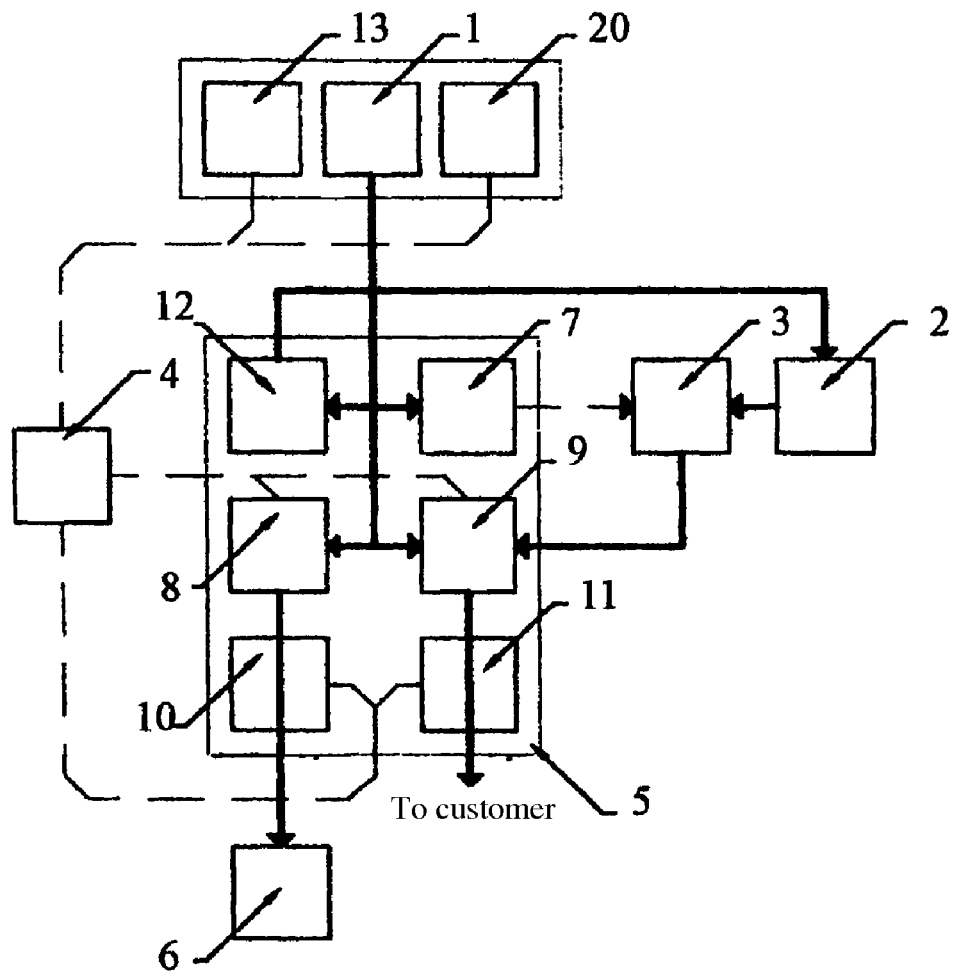
FIG. 2 illustrates more detailed the block-diagram of stabilization system for rotor speed of the wind generator as a part of the energy supply system.

Let us considering the main operating modes of the power supply system with the stabilization system for rotor speed of the wind generator and electric energy re-distribution (FIG. 2).

1. In wind absence, wind generator 1 doesn't work, and power supply of consumers is carried out by storage battery 2 through inverter 3 and switchboard 9 of network regulator 5.

2. When a wind speed is sufficient the wind generator's 1 blades of a wind wheel are getting turning. When a rotary speed of wind generator's 1 shaft exceeds a designed value, a resistive load 6 is switching on what will result in rotor braking and further, depending on the generator's rotor rotary speed sensor 20 readings, the capacity of resistive load 6 is to be corrected in one or another side. Here:

$$P_G = P_{AL}$$

where:

$P_G$—generator's output power;
$P_{AL}$—output power to a resistive load.

As soon as the generator capacity $P_G$ exceeds consumption capacity $P_{PL}$, a switchboard 9 will operate, the consumers will be switched off from inverter 3 and switched to generator line (these procedures are synchronized by synchronizer 7). In this case the power at resistive load 6 will decrease by a value equal to consumers capacity:

$$P_G = P_{PL} + P_{AL}$$

or $$P_{AL} = P_G - P_{PL}$$

In the case, if a wind power exceeds designed values, to prevent uncontrolled rise of rotor speed and wind generator capacity 1, the ACS 4 by use of mechanism 13 turns the blades of a wind wheel changing an angle of attack; by that the wind load on rotor blades and wind generator 1 tower is reducing. The blades may be turned so, that even at a gale-strength wind the load on then will be within the permissible limits, ensuring a controlled rotary speed. By such a way the wind generator operation in the optimal mode is achieved, and correspondingly reliability and long life of the system.

3. At wind velocity fall and lowering of the power delivered by wind generator 1 to a value $P_{PL}$ the power supply from the storage battery 2 is toggled on.

So, as it follows from the described above, in the operating range of wind loads and at stabilized mode of the plant operation there is no need in conversion of electric current from generator, and correspondingly, the losses connected with such conversion are absent. Electric energy is delivered directly to the consumers, and its parameters meet the parameters of the current network.

Heat energy produced by resistive load 6 during stabilizing system operation is accumulated in heat storage 14 and further will be supplied to the heat energy consumers. Heat can be used for premises heating or for hot-water supply system.

The system described has increased efficiency of electric energy utilization produced by the wind generator setup compared to the currently in use designs, because the energy required for rotor speed stabilization is not losing as it takes place during operation of mechanical or electromagnetic stabilizers, but is used for effective heat energy production.

In case the energy supply system is intended for operation in the conditions of hot climate, in the foreground is a requirement for "cold" to provide operation of air conditioning systems. In this case, instead of heat storage 14 the generator of absorption cooling machine 15 is to be used. At that, heat energy both, from resistive load 6 of stabilizing system and suntrap 17, is to be delivered to the ACM generator through a heat exchanger 16 ensuring normal ACM operation even at relative week wind.

So, the claimed Independent energy supply system works reliable in a relatively wide range of winds, and use of the stabilization system for rotor speed of the wind generator allows to maximally effective utilization of the produced by the wind generator energy and to ensure reliable accident-free operation of the whole system.

INDUSTRIAL APPLICATION

The claimed system can be used both—in conditions of cold and hot climate. The system can be manufactured on the basis of the existing instruments and component parts.

While this invention has been particularly shown and described with references to preferred embodiments thereof, it will be understood by those skilled in the art that various changes in form and details may be made therein without departing from the scope of the invention encompassed by the appended claims.

What is claimed is:
1. An independent energy supply system comprising:
   a wind generator for electric power production connected to electric power consumers;
   a converter of solar energy into heat;
   a heat accumulator connected a heat conductor to the converter of solar energy into heat;
   an electric accumulator connected to the wind generator and to the electric power consumers;
   an inverter connected to the wind generator and to the electric power consumers;
   actuators;
   heat load sensors;
   electric load sensors; and
   an automatic control system of the independent energy supply system connected through the heat load sensors and electric load sensors to the actuators,
   wherein the independent energy supply system further comprises a rotor stabilizer of the wind generator;
   wherein the rotor stabilizer comprises
      an active load; and
      a network regulator electrically connected to the wind generator and electrically connected to the active load,
   wherein the network regulator comprises:
      an active load controller,
      a wind generator current sensor,
      a resistive load sensor,
      a generator rotor speed sensor,
      a synchronizer, and
      a controllable switchboard; and
   wherein the active load is a system of electric heaters, wherein energy dissipated at the electric heaters is accumulated in the heat accumulator.

2. The independent energy supply system of claim 1 further comprising;
   a wind speed sensor, and
   a pivoting device turning wind generator blades to change an angle of attack,
   the pivoting device being electrically connected to the automatic control system and to the wind speed sensor.

3. The independent energy supply system of claim 2 further comprising an absorption cooler electrically connected to the wind generator,
   wherein the absorption cooler comprises a generator, and
   wherein heat generated by the controllable active load of the rotor stabilizer of the wind generator is supplied to the generator of the absorption cooler.

4. The independent energy supply system of claim 3 wherein the converter of solar energy into heat comprises a heat exchanger located in the generator of the absorption cooler.

* * * * *